United States Patent [19]

Savageau et al.

[11] 3,772,171
[45] Nov. 13, 1973

[54] NOVEL QUICK SETTING INKS

[75] Inventors: Robert George Savageau, Pompton Lakes, N.J.; Paul John Whyzmuzis, Jamaica, N.Y.

[73] Assignee: Inmont Corporation, New York, N.Y.

[22] Filed: Apr. 5, 1971

[21] Appl. No.: 131,466

[52] U.S. Cl..... 204/159.19, 117/93.31, 260/159.14, 260/19, 260/20, 260/23 TN, 260/27, 260/33.61
[51] Int. Cl................................................ B01j 1/10
[58] Field of Search............. 260/27, 22 TN, 23 TN, 260/DIG. 38, 33.6, 19, 20; 117/93.31; 204/159.14, 159.19

[56] References Cited
UNITED STATES PATENTS

| 3,462,267 | 8/1969 | Giangualano | 96/35.1 |
|---|---|---|---|
| 3,147,116 | 9/1964 | Roth | 96/35.1 |
| 3,316,189 | 4/1967 | Thommes | 96/35.1 |
| 3,462,267 | 8/1969 | Adams | 96/35.1 |
| 3,499,781 | 3/1970 | Krueckel | 117/93.31 |
| 3,552,986 | 1/1971 | Bassemir | 96/35.1 |
| 3,673,140 | 6/1972 | Ackerman et al. | 260/40 TN |
| 2,347,436 | 4/1944 | Root | 260/29 |

OTHER PUBLICATIONS

"Apps" Printing Ink Technology, 1958 pp. 69 and 70.

*Primary Examiner*—Donald E. Czaja
*Assistant Examiner*—W. E. Parker
*Attorney*—F. W. Wyman and P. R. Arvidson

[57] ABSTRACT

Novel quick-setting inks which contain photosensitizers and are rapidly cured to a set-off-free state by exposure to ultraviolet light. Use of anti-set-off agents such as powder sprays is thus eliminated.

6 Claims, No Drawings

NOVEL QUICK SETTING INKS

BACKGROUND OF THE INVENTION

1. Field of the Invention

This application relates to quick-setting inks. More particularly, this application relates to novel quick-setting inks which set to a set-off-free state upon exposure to ultraviolet light. Use of powder sprays to prevent set-off is thus avoided.

2. Description of the Prior Art

Quick-setting inks are well known in the art. A description of such inks, their preparation, and their method of functioning can be found in the *Printing Ink Manual*, The Society of British Printing Ink Manufacturers, W. Heffer and Sons Limited, Cambridge, England, 1969, pages 223–225 and 439–443. The use of anti-set-off agents, such as powder sprays of fine starch or wax, with such inks is also described in the *Printing Ink Manual* at pages 612 and 613. These disclosures are incorporated herein by reference.

Briefly, quick-setting inks normally comprise a colorant such as a pigment and a vehicle containing an oil or oil-derived alkyd, a solvent and a resin. The character and amounts of these vehicle materials are so balanced that they are mutually soluble so as to form a vehicle suitable for use in printing.

The oils which are useful in quick-setting inks are the drying and semi-drying oils such as those set forth on page 340 of the *Printing Ink Manual* cited above. These include linseed, tung, oiticica, dehydrated castor, fish, tobacco seed, soya bean, sunflower seed, tall, and safflower seed oils. Such useful oils normally have an iodine value of from about 110 to about 183 cgI/g oil wijs. The fatty acids of the above oils can also be employed. In addition, alkyds formed from the above oils have been found to be particularly suitable. Such alkyds, which normally have a medium to long oil length (above 50 percent), are formed by conventional methods by reacting the oil with isophthalic, terephthalic, or phthalic acid and a polyol such as pentaerythritol, glycerol, trimethylolpropane, trimethylolethane, ethylene glycol or diethylene glycol. Other suitable polyols will also be obvious to those skilled in the alkyd arts.

The solvents which can be employed in quick-setting inks are normally high boiling aliphatic hydrocarbon mixtures having a 5 percent – 95 percent boiling range between about 470° and 670° F. and KB values between about 20 and 28. These are normally mixtures of $C_{12}$ to $C_{16}$ aliphatic hydrocarbons. Examples of such materials are Magie oils 470, 500, 520, 535, 590 and 625 marketed by Magie Brothers Oil Company of Franklin Park, Illinois.

The resins which may be used in quick-setting inks are normally selected from the following categories, which are conventional resins familiar to those skilled in the ink arts:

1. Phenolic resins, such as Bakelite CKM-5254 (Union Carbide),
2. Rosin-modified phenolic resins, such as Amberol F-7 (Rohm & Haas).
3. Esters formed from pentaerythritol and the monomer or dimer of abietic acid (rosin).
4. Co-esters of pentaerythritol with the monomer or dimer of abietic acid and phthalic, isophthalic, or terephthalic acid.
5. Esters of pentaerythritol with the maleic or fumaric acid adduct of the monomer or dimer of abietic acid.
6. Glycerol, trimethylolpropane, trimethylolethane, ethylene glycol or diethylene glycol esters of the monomer or dimer of abietic acid.
7. Co-esters of glycerol, trimethylolpropane, trimethylolethane, ethylene glycol or diethylene glycol with the monomer or dimer of abietic acid and phthalic, isophthalic or terephthalic acid.
8. Esters of glycerol, trimethylolpropane, trimethylolethane, ethylene glycol or diethylene glycol with the maleic or fumaric acid adduct of abietic acid.

The oil or alkyd, the resin and the solvent should be combined in a conventional manner and in conventional proportions well known to those skilled in the art of formulating quick-setting inks. Briefly, the resin is not normally soluble or is only marginally soluble in the solvent which is used, without the addition of the oil or alkyd as a cosolvent. The proportions of the three components of the ink vehicles are normally within the following ranges:

Oil or alkyd — 10 to 40 percent by weight, preferably 15 to 30 percent.

Resin — 10 to 60 percent by weight, preferably 20 to 40 percent.

Solvent — 10 to 40 percent by weight, preferably 15 to 30 percent.

In the normal course of printing and drying these inks, the cosolvent oil or alkyd is oxidized by ambient air curing, thus destroying the solubility balance and converting the solution into a dispersion. The solvent is then much more easily absorbed by the paper upon which the ink is printed, rendering the remaining resin and oil quite viscous and thus forming and setting the image on the paper. Cure to a set-off-free state normally takes 40 minutes to an hour. Subsequent complete cure is obtained by oxidation over a period of up to about 4 – 6 hours, depending upon the type of paper used and the temperature and humidity conditions of curing. Due to the necessity of storing large amounts of printed paper emanating from commercial printing processes, wax or powder sprays are normally used to coat the surface of the viscous ink to prevent set-off upon adjacent stacked sheets while the ink is curing by oxidation to a set-off free state.

SUMMARY OF THE INVENTION

Applicants have now very unexpectedly discovered that incorporation in conventional quick-setting inks of small amounts of photosensitizers and subsequent exposure of the printed sheet to ultra-violet light or equivalent actinic radiation results in an ink which is almost immediately cured to a set-off free state. Thus, use of powder and other sprays can be eliminated.

Elimination of such powder treatments is a great advantage since it eliminates the cost of the powders and spray equipment, eliminates the inconvenient, dirty and dangerous effects of free powder in the press room, and also eliminates the somewhat rough feel of a printed surface which has been exposed to such powder treatment.

Applicant's discovery is particularly unexpected since these conventional quick-setting inks do not contain materials which would normally be expected to cure by photochemical reaction. For example, they do not contain acrylic or methacrylic acid esters.

DESCRIPTION OF THE PREFERRED EMBODIMENT

The photosensitizers which may be used in the ink compositions of this invention are more particularly described in commonly assigned U. S. application Ser. No. 104,343, now U.S. Pat. No. 3,673,140, at page 7. Also disclosed in that application at pages 9 – 12 are the apparatus and method by which these novel inks can be cured. These disclosures are incorporated herein by reference.

Briefly, the photosensitizers which may be used are those having a triplet energy between about 42 and about 85 kcal/mole. Many materials which are within this range are disclosed in Table 5 – 13 on page 132 of *Molecular Photochemistry* by N. J. Turro (W. A. Benjamin, Inc. 1967), which is incorporated herein by reference.

Applicants have found that an 8 to 1 mixture, by weight, of benzophenone and Michler's Ketone, respectively, is particularly suitable as a photosensitizer. This photosensitizer can be present in the ink in amounts ranging from about 1 percent to about 20 percent, preferably from about 3 percent to about 12 percent and particularly about 5 to 6 percent by weight.

Normally, exposure of the freshly printed surface will be conducted by passing the surface beneath a conventional U. V. lamp at a distance of a few inches. Exposure time is normally only a few seconds. Such a lamp is normally equipped with a reflector, such as a semi-elliptical reflector. The determination of minimum exposure time, distance from the light and power of the light to achieve a set-off-free state with a given amount and type of photosensitizer are all well within the skill of those skilled in the printing arts in view of the information contained in the examples. However, as a guide, and not as a minimum, an energy striking the substrate of from about 0.05 joules/cm$^2$ for red ink to about 0.1 joules/cm$^2$ for black ink will be effective under normal conditions such as those described herein.

Applicants believe that their invention operates in the manner set forth below.

A portion of the drying oil (or alkyd) in the wet ink film, which comprises a critical solubility balance of solvent, resin and drying oil, when activated with light sensitive material, such as a mixture of benzophenone and Michler's Ketone, and then exposed to U. V. radiation, is cross linked. This cross linking disturbs the solubility balance of the system, causing the solvent to be rejected from the film and absorbed by the substrate. The remaining film is of a sufficiently high viscosity to be considered tack free, thus also being set-off free. After U. V. exposure, further cross-linking also takes place at an accelerated rate until the final dried film properties are obtained.

Another unexpected result achieved from use of the novel inks of this invention is a faster cure to a dry state. As pointed out above, normal complete cure by oxidation takes up to about 4 – 6 hours, depending on the type of paper substrate and temperature and humidity conditions. Use of the photoinitiator and exposure to ultraviolet light has been found to result in complete cure in a period of, for example, about 2 hours.

Examples 1 and 2 below compare the results obtained with a conventional quick-set ink (Example 1) and a novel ink within the scope of this invention (Example 2). All parts are by weight.

Example 1

An ink was prepared by mixing:

| Parts | |
|---|---|
| 21.0 | Carbon black |
| 21.5 | Vehicle A (See Appendix) |
| 50.0 | Vehicle B (See Appendix) |
| 2.0 | Cobalt soyate drying catalyst (See Appendix) |
| 7.5 | Aliphatic hydrocarbon |
| 102.0 | solvent (See Appendix) |

A sheet of 50 lb. coated paper substrate was printed with this ink and was air dried at ambient pressroom conditions. The ink cured to a set-off-free state in about 40 minutes. Complete cure to dryness was obtained in about 6 hours.

EXAMPLE 2

Six parts of a photosensitizer comprised of an 8 to 1 mixture of benzophenone and Michler's Ketone were added to an ink having the composition set forth in Example 1. This ink was printed on a sheet of 50 lb. coated paper substrate and immediately thereafter exposed to ultraviolet light from a 450 watt Hanovia lamp at a distance of about 3 inches for a period of about 1 second. The resulting printed surface was immediately set-off free, and complete cure to dryness was obtained in about 2 hours by subsequent air drying at ambient conditions.

In addition to the materials set forth above, the novel inks of this invention may also contain up to about 15% by weight of conventional ink additives such as waxes, for added abrasion resistance, cream of tartar, to improve lithographic properties, and other conventional additives.

APPENDIX

All parts below are by weight

| | Parts | |
|---|---|---|
| Vehicle A | 42.0 | maleic acid modified pentaery-thritol rosin ester(1:1.5 mixture of Hercules Pentalyn G and Pentalyn X) |
| | 41.2 | Polyester (see below) |
| | 16.8 | aliphatic hydrocarbon solvent (Initial boiling point 533°F; No. 896 Mineral Seal Oil - Gulf) |
| | 100.0 | |
| Vehicle B | 85.0 | Vehicle C |
| | 9.8 | aluminum polyester gellant additive (see composition below) |
| | 5.2 | aliphatic hydrocarbon solvent of Vehicle A |
| | 100.0 | |
| Polyester | 69.4 | lineseed oil |
| | 9.5 | glycerine |
| | 20.9 | isophthalic acid |
| | 99.8 | |
| Aluminum Polyester Gellant | | |
| | 33.2 | Tridecyl alcohol |
| | 23.3 | Phthalic anhydride |
| | 14.7 | Aluminum isopropylate |

The reaction product of the above is dissolved in 28.8 parts aliphatic hydrocarbon solvent of Vehicle A. Total parts 100.0

Cobalt Soyate Drying Catalyst

| Parts | |
|---|---|
| 40.0 | Soya fatty acid |
| 7.2 | Cobalt hydrate |
| 7.2 | acetic acid |

The reaction product of the above is reduced to 4.5% cobalt by adding

| | | |
|---|---|---|
| | 31.0 | 1:1 ratio of Hercules Pentalyn A (maleic acid modified pentaery-thritol rosin ester) and Glidden's Sylvaros R (a tall oil resin) |
| | 14.6 | Linseed oil |
| | 100.0 | |
| Vehicle C | 40.0 | maleic modified pentaerythritol rosin ester (Hercules Pentalyn X) |
| | 20.0 | above-mentioned Polyester |
| | 40.0 | above-mentioned aliphatic hydro carbon solvent |
| | 100.0 | |

We claim:

1. In quick setting ink composition containing a vehicle comprising a mixture of
   a. high boiling hydrocarbon solvent means,
   b. oil or alkyd cosolvent means selected from the group consisting of
      i. drying and semi-drying oils, and
      ii. alkyds derived from the oils of (i) by reaction with isophthalic, terephthalic or phthalic acid and a polyol selected from the group consisting of pentaerythritol, glycerol, trimethylolpropane, trimethylolethane, ethylene glycol and diethylene glycol, and
   c. resin means soluble in a mixture of said solvent and cosolvent means but largely insoluble in either alone selected from the group consisting of
      i. phenolic and rosin-modified phenolic resins,
      ii. esters of pentaerythritol, glycerol, trimethylolpropane, trimethylolethane, ethylene glycol or diethylene glycol and the monomer or dimer of abietic acid or the fumaric or maleic adduct thereof, and
      iii. coesters of (c) (ii) with phthalic, isophthalic or terephthalic acid, wherein setting is primarily achieved by breaking the solubility balance and subsequent absorption of the solvent means into the substrate, thus depositing the remaining oil or alkyd means and resin means on the substrate, the improvement comprising inclusion in the vehicle of an effective amount of an actinic radiation photosensitizer.

2. The ink composition of claim 1 wherein the photosensitizer has a triplet energy between about 42 and about 85 kcal/mol.

3. The ink composition of claim 2 wherein the effective amount of photosensitizer is between about 1% and 20 percent by weight.

4. The ink composition of claim 3 wherein the amount is between about 3 and 12 percent by weight.

5. The ink composition of claim 2 wherein the photosensitizer comprises benzophenone and Michler's Ketone.

6. In a process of setting a conventional solvent-containing quick-setting ink comprising printing the ink on an absorbent substrate and setting the ink to a set-off-free state by breaking the solubility balance and absorbing the solvent into the substrate, the improvement comprising accelerating the breaking of the solubility balance and the absorption and subsequent curing by including in the ink prior to printing an effective amount of an actinic radiation sensitizer and exposing the printed substrate to an amount of actinic radiation means effective to substantially increase the rate of the absorption of the solvent into the substrate.

* * * * *